(12) United States Patent
Brown et al.

(10) Patent No.: US 7,925,210 B2
(45) Date of Patent: Apr. 12, 2011

(54) SYNCHRONIZING A RADIO NETWORK WITH END USER RADIO TERMINALS

(75) Inventors: Jim Brown, Laguna Beach, CA (US); Gengsheng Zhang, Cupertino, CA (US); Lionel Garin, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 747 days.

(21) Appl. No.: 11/205,510

(22) Filed: Aug. 16, 2005

(65) Prior Publication Data
US 2006/0013347 A1 Jan. 19, 2006

Related U.S. Application Data

(63) Continuation-in-part of application No. 10/154,138, filed on May 21, 2002.

(60) Provisional application No. 60/292,774, filed on May 21, 2001.

(51) Int. Cl.
H04H 40/08 (2006.01)

(52) U.S. Cl. ........... 455/13.2; 340/7.26; 340/825.2; 342/357.12

(58) Field of Classification Search .......... 375/354; 455/13.2
See application file for complete search history.

(56) References Cited

U.S. PATENT DOCUMENTS

| | | |
|---|---|---|
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,202,829 A | 4/1993 | Geier |
| 5,225,842 A | 7/1993 | Brown et al. |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,536 A | 9/1994 | Meehan |

(Continued)

FOREIGN PATENT DOCUMENTS

EP 0511741 11/1992

(Continued)

*Primary Examiner* — Yuwen Pan
*Assistant Examiner* — Hai V Nguyen
(74) *Attorney, Agent, or Firm* — K&L Gates LLP

(57) ABSTRACT

Synchronizing a Radio Network with End User Radio Terminals A Mobile Station that is able to receive GPS signals and compare the frequency of the GPS received time signal with a time signal from a network in order to determine the difference between the signals and communicate that difference back to the network.

6 Claims, 5 Drawing Sheets

U.S. PATENT DOCUMENTS

| | | | |
|---|---|---|---|
| 5,379,224 A | 1/1995 | Brown et al. | |
| 5,402,347 A | 3/1995 | McBurney et al. | |
| 5,416,712 A | 5/1995 | Geier et al. | |
| 5,416,808 A * | 5/1995 | Witsaman et al. | 375/356 |
| 5,420,593 A | 5/1995 | Niles | |
| 5,440,313 A | 8/1995 | Osterdock et al. | |
| 5,450,344 A | 9/1995 | Woo et al. | |
| 5,481,258 A * | 1/1996 | Fawcett et al. | 340/7.26 |
| 5,504,684 A | 4/1996 | Lau et al. | |
| 5,508,708 A * | 4/1996 | Ghosh et al. | 342/457 |
| 5,592,173 A | 1/1997 | Lau et al. | |
| 5,625,668 A | 4/1997 | Loomis et al. | |
| 5,663,734 A | 9/1997 | Krasner | |
| 5,663,735 A | 9/1997 | Eshenbach | |
| 5,697,051 A | 12/1997 | Fawcett | |
| 5,736,964 A * | 4/1998 | Ghosh et al. | 342/457 |
| 5,764,188 A * | 6/1998 | Ghosh et al. | 342/457 |
| 5,781,156 A | 7/1998 | Krasner | |
| 5,786,789 A | 7/1998 | Janky | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,903,654 A | 5/1999 | Milton et al. | |
| 5,907,578 A | 5/1999 | Pon et al. | |
| 5,907,809 A | 5/1999 | Molnar et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,977,909 A | 11/1999 | Harrison et al. | |
| 5,982,324 A * | 11/1999 | Watters et al. | 342/357.06 |
| 5,987,016 A | 11/1999 | He | |
| 5,999,124 A | 12/1999 | Sheynblat | |
| 6,002,362 A | 12/1999 | Gudat | |
| 6,002,363 A | 12/1999 | Krasner | |
| 6,009,551 A | 12/1999 | Sheynblat | |
| 6,016,119 A | 1/2000 | Krasner | |
| 6,018,667 A * | 1/2000 | Ghosh et al. | 455/502 |
| 6,041,222 A | 3/2000 | Horton et al. | |
| 6,047,017 A | 4/2000 | Cahn et al. | |
| 6,052,081 A | 4/2000 | Krasner | |
| 6,054,950 A * | 4/2000 | Fontana | 342/463 |
| 6,061,018 A | 5/2000 | Sheynblat | |
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd et al. | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,166,691 A * | 12/2000 | Lindqvist | 342/465 |
| 6,192,247 B1 | 2/2001 | Dillon et al. | |
| 6,208,871 B1 * | 3/2001 | Hall et al. | 455/517 |
| 6,236,359 B1 * | 5/2001 | Watters et al. | 342/357.1 |
| 6,249,245 B1 * | 6/2001 | Watters et al. | 342/357.03 |
| 6,285,316 B1 * | 9/2001 | Nir et al. | 342/357.09 |
| 6,308,076 B1 * | 10/2001 | Hoirup et al. | 455/502 |
| 6,331,836 B1 * | 12/2001 | Jandrell | 342/357.12 |
| 6,389,291 B1 * | 5/2002 | Pande et al. | 455/456.5 |
| 6,427,120 B1 * | 7/2002 | Garin et al. | 701/213 |
| 6,430,416 B1 * | 8/2002 | Loomis | 455/456.1 |
| 6,433,734 B1 * | 8/2002 | Krasner | 342/357.09 |
| 6,433,739 B1 * | 8/2002 | Soliman | 342/387 |
| 6,438,382 B1 * | 8/2002 | Boesch et al. | 455/456.6 |
| 6,449,290 B1 * | 9/2002 | Willars et al. | 370/507 |
| 6,498,585 B2 * | 12/2002 | Jandrell | 342/357.12 |
| 6,519,466 B2 * | 2/2003 | Pande et al. | 455/456.1 |
| 6,542,823 B2 * | 4/2003 | Garin et al. | 701/213 |
| 6,603,978 B1 * | 8/2003 | Carlsson et al. | 455/502 |
| 6,611,755 B1 * | 8/2003 | Coffee et al. | 701/213 |
| 6,650,285 B2 * | 11/2003 | Jandrell | 342/357.12 |
| 6,665,332 B1 * | 12/2003 | Carlson et al. | 375/130 |
| 6,665,541 B1 * | 12/2003 | Krasner et al. | 455/502 |
| 6,678,510 B2 * | 1/2004 | Syrjarinne et al. | 455/255 |
| 6,684,158 B1 * | 1/2004 | Garin et al. | 701/213 |
| 6,703,971 B2 * | 3/2004 | Pande et al. | 342/357.09 |
| 6,704,547 B2 * | 3/2004 | Kuwahara et al. | 455/67.16 |
| 6,748,202 B2 * | 6/2004 | Syrjarinne et al. | 455/255 |
| 6,771,625 B1 * | 8/2004 | Beal | 370/336 |
| 6,850,557 B1 * | 2/2005 | Gronemeyer | 375/150 |
| 6,865,380 B2 * | 3/2005 | Syrjarinne | 455/255 |
| 6,901,264 B2 * | 5/2005 | Myr | 455/456.5 |
| 6,915,208 B2 * | 7/2005 | Garin et al. | 701/213 |
| 6,925,292 B2 * | 8/2005 | Syrjarinne et al. | 455/255 |
| 6,937,866 B2 | 8/2005 | Duffett-Smith et al. | |
| 6,937,872 B2 * | 8/2005 | Krasner | 455/502 |
| 6,952,158 B2 * | 10/2005 | Kennedy, Jr. | 340/286.14 |
| 6,985,542 B1 * | 1/2006 | Nir et al. | 375/343 |
| 6,987,979 B2 * | 1/2006 | Carlsson | 455/456.6 |
| 7,013,147 B1 * | 3/2006 | Kuwahara et al. | 455/456.1 |
| 7,039,098 B2 * | 5/2006 | Younis | 375/149 |
| 7,053,824 B2 * | 5/2006 | Abraham | 342/357.1 |
| 7,057,553 B2 * | 6/2006 | Jandrell | 342/357.12 |
| 7,065,374 B2 * | 6/2006 | Lipp et al. | 455/502 |
| 7,085,546 B2 * | 8/2006 | Syrjarinne et al. | 455/255 |
| 7,139,225 B2 * | 11/2006 | Farmer | 368/46 |
| 7,146,516 B2 * | 12/2006 | Dhupar et al. | 713/400 |
| 7,151,944 B2 * | 12/2006 | Hashem et al. | 455/502 |
| 7,154,436 B1 * | 12/2006 | Chadha | 342/357.1 |
| 7,171,225 B2 * | 1/2007 | Krasner et al. | 455/502 |
| 7,215,967 B1 * | 5/2007 | Kransmo et al. | 455/456.2 |
| 7,218,938 B1 * | 5/2007 | Lau et al. | 455/456.1 |
| 7,236,883 B2 * | 6/2007 | Garin et al. | 701/213 |
| 7,283,091 B1 * | 10/2007 | Loomis | 342/357.15 |
| 7,295,156 B2 * | 11/2007 | Van Wyck Loomis | 342/357.43 |
| 7,302,225 B2 * | 11/2007 | Younis | 455/12.1 |
| 7,551,129 B2 * | 6/2009 | Farmer | 342/357.42 |
| 7,551,888 B2 * | 6/2009 | Kopra et al. | 455/3.05 |
| 7,577,448 B2 * | 8/2009 | Pande et al. | 455/456.6 |
| 7,701,387 B2 * | 4/2010 | Syrjarinne | 342/357.42 |
| 2001/0002822 A1 * | 6/2001 | Watters et al. | 342/357.1 |
| 2001/0012760 A1 * | 8/2001 | Avis | 455/13.2 |
| 2001/0030625 A1 * | 10/2001 | Doles et al. | 342/387 |
| 2001/0039192 A1 | 11/2001 | Osterling | |
| 2001/0052849 A1 * | 12/2001 | Jones, Jr. | 340/572.1 |
| 2002/0004398 A1 | 1/2002 | Ogino et al. | |
| 2002/0086684 A1 * | 7/2002 | Pande et al. | 455/456 |
| 2002/0094821 A1 * | 7/2002 | Kennedy, Jr. | 455/456 |
| 2002/0107031 A1 * | 8/2002 | Syrjarinne et al. | 455/456 |
| 2002/0111171 A1 * | 8/2002 | Boesch et al. | 455/456 |
| 2002/0111739 A1 * | 8/2002 | Jandrell | 701/214 |
| 2002/0116124 A1 * | 8/2002 | Garin et al. | 701/213 |
| 2002/0123352 A1 | 9/2002 | Vayanos et al. | |
| 2002/0154058 A1 * | 10/2002 | Pande et al. | 342/357.09 |
| 2002/0173322 A1 * | 11/2002 | Turetzky et al. | 455/502 |
| 2002/0183069 A1 * | 12/2002 | Myr | 455/456 |
| 2002/0183076 A1 * | 12/2002 | Pande et al. | 455/456 |
| 2003/0058833 A1 * | 3/2003 | Hashem et al. | 370/350 |
| 2003/0109264 A1 | 6/2003 | Syrjarinne et al. | |
| 2003/0128158 A1 * | 7/2003 | Jandrell | 342/357.12 |
| 2004/0092275 A1 * | 5/2004 | Krasner et al. | 455/502 |
| 2004/0137916 A1 * | 7/2004 | Syrjarinne et al. | 455/456.1 |
| 2005/0003833 A1 * | 1/2005 | Younis | 455/456.1 |
| 2005/0037724 A1 * | 2/2005 | Walley et al. | 455/302 |
| 2005/0060089 A1 * | 3/2005 | Garin et al. | 701/213 |
| 2005/0062643 A1 * | 3/2005 | Pande et al. | 342/357.1 |
| 2005/0066373 A1 * | 3/2005 | Rabinowitz et al. | 725/131 |
| 2005/0080561 A1 * | 4/2005 | Abraham et al. | 701/213 |
| 2005/0162306 A1 * | 7/2005 | Babitch et al. | 342/357.05 |
| 2005/0162310 A1 * | 7/2005 | Pande et al. | 342/357.12 |

| | | | |
|---|---|---|---|
| 2005/0231425 A1* | 10/2005 | Coleman et al. ............. 342/385 |
| 2006/0013347 A1* | 1/2006 | Brown et al. ................. 375/354 |
| 2006/0038719 A1* | 2/2006 | Pande et al. .............. 342/357.12 |
| 2006/0104334 A1* | 5/2006 | Hervey et al. ................ 375/133 |
| 2006/0119505 A1* | 6/2006 | Abraham ................. 342/357.09 |
| 2006/0121922 A1* | 6/2006 | Krasner ....................... 455/517 |
| 2006/0208169 A1* | 9/2006 | Breed et al. .................. 250/221 |
| 2006/0234724 A1* | 10/2006 | Syrjarinne et al. ......... 455/456.1 |
| 2006/0244658 A1* | 11/2006 | Abraham ................. 342/357.15 |
| 2006/0290566 A1* | 12/2006 | Syrjarinne et al. ....... 342/357.15 |
| 2007/0123248 A1* | 5/2007 | Krasner et al. ............. 455/422.1 |
| 2007/0159387 A1* | 7/2007 | Syrjarinne et al. ....... 342/357.09 |
| 2007/0171125 A1* | 7/2007 | Abraham et al. ........ 342/357.09 |
| 2007/0182633 A1* | 8/2007 | Omura et al. ................. 342/464 |
| 2007/0217562 A1* | 9/2007 | Underbrink et al. ............ 377/16 |
| 2008/0084850 A1* | 4/2008 | Chen et al. .................... 370/335 |
| 2008/0150796 A1* | 6/2008 | Syrjarinne ............... 342/357.01 |
| 2009/0153399 A1* | 6/2009 | Abraham et al. ........ 342/357.12 |
| 2009/0219198 A1* | 9/2009 | Zhang et al. ............. 342/357.06 |

FOREIGN PATENT DOCUMENTS

| | | |
|---|---|---|
| GB | 2115195 | 1/1983 |
| JP | 58-105632 | 6/1983 |
| JP | 7-36035 | 5/1986 |
| JP | 4-326079 | 11/1992 |
| WO | WO 90/11652 | 10/1990 |
| WO | WO 01/78260 | 10/2001 |

* cited by examiner

SYNCHRONIZING A RADIO NETWORK WITH END USER RADIO TERMINALS

RELATED APPLICATIONS

This application is a continuation-in-part of U.S. patent application Ser. No. 10/154,138 filed on May 21, 2002 entitled METHOD FOR SYNCHRONIZING A RADIO NETWORK USING END USER RADIO TERMINALS, by Gregory B. Turetzky et al, which a claim to priority is made and is incorporated by reference herein and further claims priority to U.S. Provisional Patent Application No. 60/292,774 filed on May 21, 2001 entitled "METHOD FOR SYNCHRONIZING A RADIO NETWORK USING END USER RADIO TERMINALS", by Gregory B. Turetzky et al, which a claim to priority is made and is incorporated by reference herein.

BACKGROUND OF THE INVENTION

1. Field of the Invention

The present invention relates in general to Global Satellite System (GSS) receivers, and in particular to a method for synchronizing a radio network using end user radio terminals.

2. Related Art

Cellular telephony, including Personal Communication System (PCS) devices, has become commonplace. The use of such devices to provide voice, data, and other services, such as Internet access, provides many conveniences to cellular systems users. Further, other wireless communications systems, such as two-way paging, trunked radio, Specialized Mobile Radio (SMR) used by first responders, such as police, fire, and paramedic departments, have also become essential for mobile communications.

The Federal Communication Commission (FCC) has implemented a requirement that Mobile Stations (MS), such as cellular telephones be locatable within 50 feet once an emergency call, such as a "911" call (also referred to as "Enhanced 911" or "E911") is placed by a given cellular telephone. Such position data assists police, paramedics, and other law enforcement and public service personnel, as well as other agencies that may need or have legal rights to determine the cellular telephone's position.

Currently, cellular and PCS systems are incorporating Global Positioning Systems (GPS) technology that uses GPS receivers in cellular telephone devices and other wireless transceivers to meet the FCC location requirement.

Such data can be of use for other than E911 calls, and would be very useful for wireless network users, such as cellular and PCS subscribers. For example, GPS data may be used by the MS user to locate other mobile stations, determine the relative location of the mobile station user to other landmarks, obtain directions for the cellular user via internet maps or other GPS mapping techniques, etc.

One significant problem with GPS receivers in a MS is that the GPS receiver may not always have an unobstructed view of the sky causing the received signals to be very weak. Often, the receiver is unable to demodulate the Almanac or Ephemeris data, making it impossible to determine the user's location or accurate GPS time. This problem may be addressed by transmitting Ephemeris and/or Almanac data and GPS time to the receiver over a communication network. A common feature of communication networks is a large and variable transmission delay, making it difficult to transmit accurate (uncertainty less than 1 millisecond) time.

The concept of locating a mobile unit by triangulating a set of ranges from either a set of fixed points (such as cellular transmitters) or mobile transmitters (such as GPS satellites) have a common requirement that the time of transmission is known. This implies that the time at all transmitters must be common, or the differences known. In many systems today, this information is not immediately available since the systems are focused on data transmission rather than ranging. Therefore, there is a need in the art to overcome the problem of transmission delay in both synchronized and unsynchronized networks.

Code Division Multiple Access (CDMA)(TIA/IS-95B) networks use a GPS time reference standard at every base station, and all transmission frames are absolutely synchronized onto GPS time. Therefore, a Mobile Station, by observing particular transitions on frame, master frame or hyper frame, may predict absolute GPS time within tens of microseconds, including radio transmission delay and group delays inside the mobile station or wireless handset.

Other classes of wireless networks, e.g., Time Division Multiple Access (TDMA), GSM, Analog Mobile Phone Systems (AMPS, TACS), DTV, etc., are not synchronized onto GPS time. Still, the accuracy, precision and stability of the master clock used at the base stations is fairly stable, and slowly varies relative to GPS time. Hence, both the time offset and frequency drift are very stable compared to GPS time, and can be monitored at relatively large intervals. However, any timing information derived solely from such a system has limited value, as there is currently no way to derive absolute GPS time from it.

One solution that has been proposed is to locate stationary monitoring entities, called LMU (Local Measurement Units), which are in radio visibility of several base stations (BS) in a given area. The LMU consists of a wireless section and a GPS timing receiver. At intervals, they measure time offset and frequency drift of every base station in the area, relative to GPS time. As one LMU can cover only a few Base Stations, the overlay monitoring network can become quite large and expensive. It necessitates communication links between the LMU's and a central network entity, which logs this information per BS, merges information from different sources (if several LMU's monitor the same Base Station), and delivers this information to a geolocation server if time assistance has to be delivered to a particular MS in the BS's visibility area. This requires several pieces of additional network infrastructure, as well as additional software and maintenance costs for the network operator to enable such a feature. Thus, there is a need in the art to eliminate the need for LMU's and the associated costs.

It can be seen, then, that there is a need in the art for delivering GPS data in a wireless communications systems, including cellular and PCS subscribers, in an efficient manner. It can also be seen that there is a need in the art for GPS capable MS, such as wireless handsets. It can also be seen that there is a need in the art to be able to aid the GPS receiver to speed acquisition and for position determination. It can also be seen that there is a need in the art to be able to aid the GPS receiver to provide more precise position determination. It can also be seen that there is a need in the art for a large cellular system that can use and/or supply GPS information to cellular users for a number of applications, including E911 without the requirement of geographically proximate base stations.

SUMMARY

Approaches consistent with the present invention provide synchronization of a radio network through the use of end user radio terminals. An end user radio terminal, such as Mobile Stations (MS) having a GPS receiver is able to determine the relationship between the Base Station signal timing events and GPS time, and to determine its clock frequency offset. This data may then be transferred to the Base Station (i.e. the network) for synchronization of the network. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
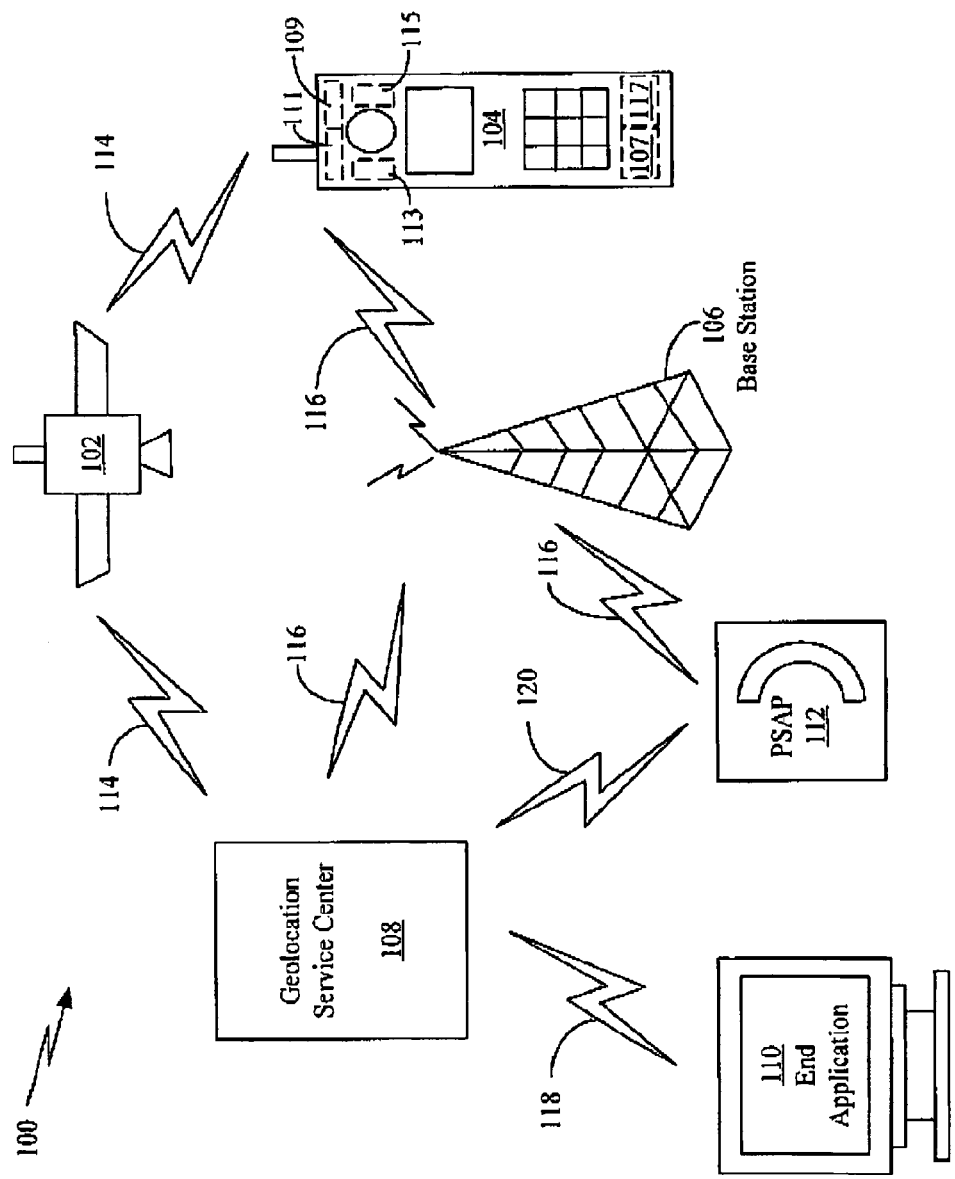
FIG. 1 illustrates a typical OPS architecture.

In FIG. 1 a typical GPS architecture is shown. System 100 comprises GPS satellite 102, which is illustrative of the constellation of GPS satellites that are in orbit, a MS (i.e. wireless handset 104) which may include a GPS receiver, a base station 106, a geolocation (server) service center 108, a geolocation end application 110, and a Public Safety Answering Point (PSAP) 112. The Mobile Station (MS) 104, such as a wireless handset, Personal Digital Assistant (PDA), or similar mobile device may have location technology of the present invention and may use GPS technology in support of various MS device implementations of E911 and geo-location services. The PSAP 112 and the geolocation end application 110 are included for reference only.

The GPS satellite 102 transmits spread spectrum signals 114 that are received at the wireless handset 104 and the geolocation server 108. For ease of illustrative purposes, the other GPS satellites are not shown, however, other GPS satellites also are transmitting signals that are received by the wireless handset 104 and the geolocation server 108. If the wireless handset 104 receives strong enough spread spectrum signals 114, the GPS receiver (not shown) in the wireless handset 104 may autonomously compute the position of the wireless handset 114 as is typically done in the GPS system. However, unless they are in open sky environments wireless handsets 104 are typically not able to receive strong enough spread spectrum signals 114 to autonomously compute the position of the wireless handset 104, but can still communicate with base station 106. Thus, base station 106 may communicate information via signals 116 to wireless handset 104 to allow wireless handset 104 to compute the location, or may transmit information from wireless handset 104 to the geolocation server 108 to enable the geolocation server 108 to compute the position of the wireless handset 104. If the base station 106 is transferring information to the wireless handset 104 to allow the wireless handset 104 to compute position, it is called "wireless aided GPS" or "MS Based," whereas when the base station 106 transfers information from the wireless handset 104 to the geolocation server 108 for the geolocation server 108 to compute the position of the wireless handset 104, it is called "network-centric GPS" or "MS Assisted."

Geolocation server 108 may also communicates with geolocation application 110 via signals 118 and with PSAP 112 via signals 120. These signals 118 and 120 may either be via wireless links, such as cellular, WiFi, Blue Tooth, to name but a few, or may be through the landline network, such as PSTN, Ethernet, or other such wired networks, to name but a few.

If it is a cellular telephone, for example, the wireless handset 104 may include a typical wireless handset section that performs the call processing (CP) function, and a GPS section for position computation, pseudorange measurement, and other GPS functions. A serial communication link, or other communication link, performs the communications between the CP section and the GPS section. A collection of hardware lines may be utilized to transmit signals between the CP and GPS section. In yet another implementation, both the CP and GPS sections may share circuitry.

If the MS 104 has the ability to compute GPS position, it gets GPS time from the GPS signal, and is able to calculate the offset between GPS time and the cell site clock. This is true whether or not the GPS portion of the MS 104 received assistance data from the geolocation service center 108. In unsynchronized networks, each cell site clock will have a different offset from GPS time, necessitating the pairing of cell site identifiers with the measured offset. In some wireless handset designs, the frequency error of the base station clock may also be computed.

The offset and frequency error may then be stored in the phone, and/or transmitted to the network (via signals 116) for storage in a database (possibly contained in the geolocation service center 108). Each time a wireless handset goes through that cell, the offset and error may be updated. If it is not possible to make a direct measurement of base station frequency error, then multiple clock-offset measurements may be used to determine drift rates.

Non-network related storage that is capable of being accessed via a data link such as SMS or GPRS may also be used such that independent service providers could store and forward time assistance information to other wireless handset units independent of the network.

This concept may also be used in conjunction with other localized networks like Nextel, SMS, FRS, etc. where a group of wireless handsets or mobile communication devices may help each other to determine location. For example, where a wireless handset gets a fix, that wireless handset can transmit offset information, or transmit other information via a non-cellular network, such as SMS, CB bands, WiFi, Blue Tooth, or whatever, to other wireless handsets that use that network, or are part of a group of devices used by the same company.

If the MS 104 lacks the ability to compute GPS position, it may capture simultaneous events from the GPS signals and the Base Station signals, and send them via signals 116 to a server, which is able to compute GPS position of the MS 104. After such computation, the server will be able to determine precise GPS time, and compute the offset (and drift) between GPS time and the clock in the Base Station. This information may then be transmitted via signals 116 to other MS 104 devices to assist their acquisition of GPS signals, whether or not those MS devices have the ability to compute their own GPS position.

Figure 2:
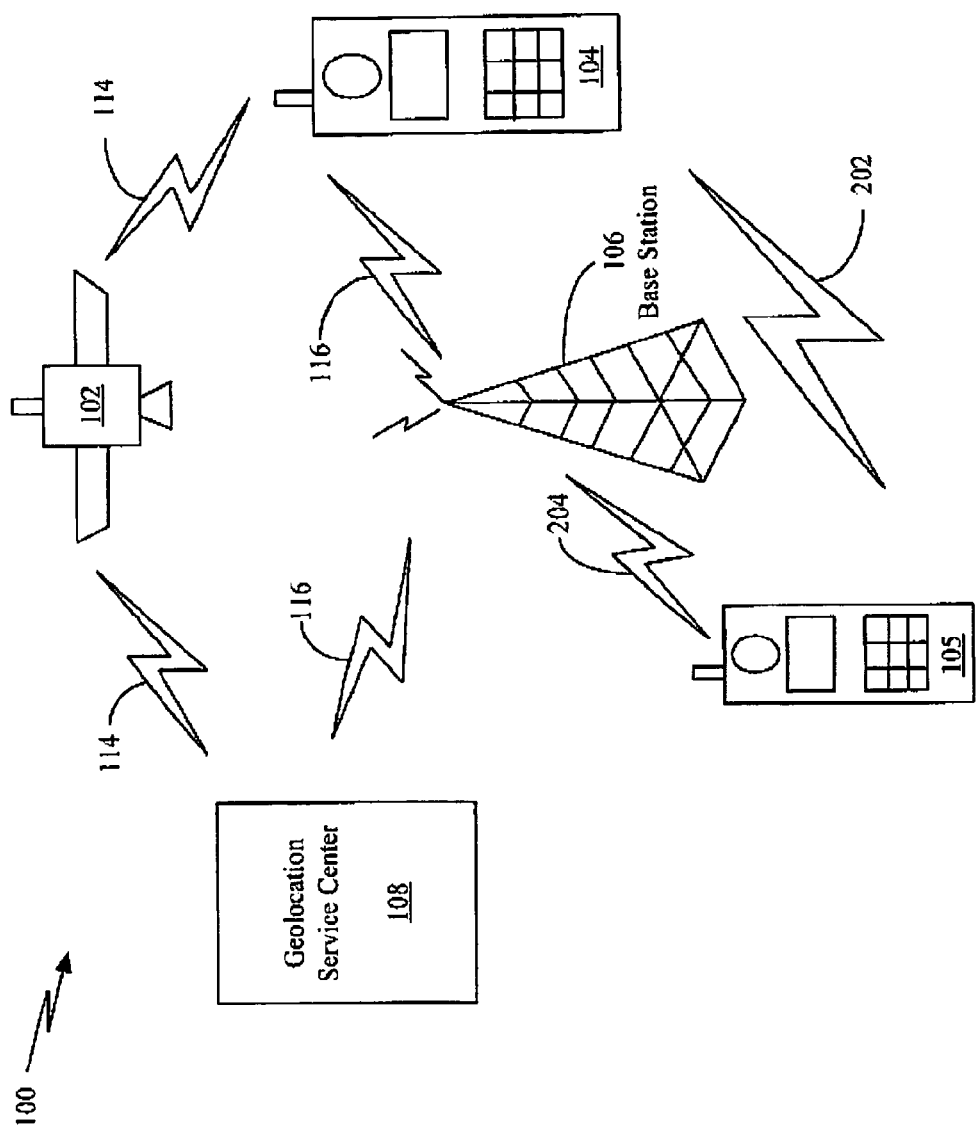
FIG. 2 illustrates an implementation of synchronizing a radio network with end user radio terminals.

Turning to FIG. 2, an implementation of synchronizing a radio network using end user radio terminals is shown. System 100 has a set of GPS satellites (illustrated by 102), a base station 106, a geolocation service center 108 and two wireless handsets 104 and 105.

As described earlier, wireless handset 104 receives signals from satellites 102 and either computes a GPS position locally, or transmits via signals 116 sufficient information to allow a server, such as the geolocation service center 108, to compute the position. Concomitant with computing the GPS position, a controller (not shown) in the wireless handset 104 or the geolocation service center 108 or some other device (not shown), determines the time offset and/or drift between GPS time and the clock in the base station 106.

Wireless handset 105 is illustrative of a wireless device containing a GPS receiver which requires knowledge of the clock offset and/or drift of the base station 106 clock in order to acquire satellite 102 signals and produce a GPS position fix. Depending on the type of network and its design, wireless handset 105 may receive the required data from wireless handset 104 directly via signals 202, from base station 106 via signals 204, or from the geolocation service center via signals 116 and 204 in sequence. Other sources of this information may include non-network devices (not shown) that may be implemented by independent service providers.

In another implementation, wireless handset 105 and wireless handset 104 may be the same wireless handset, used at different times. Wireless handset 104 may compute the clock offset and drift at one time, then be turned off and forget the previously computed data. Upon being re-powered, wireless handset 104 may require this data and may retrieve it (or a more recently computed value) from the base station 106, the geolocation service center 108 or some other source.

Alternatively, wireless handset 104 may compute the clock offset and/or drift of the clock in base station 106, then be turned off, but store the previously computed data. Upon being re-powered, the wireless handset may recall the data from its own memory without making use of any external data store. In some cases, this may eliminate the need for timekeeping in the MS when the MS is powered off which may increase battery time between charging.

The wireless handset may also build up a database of offsets computed for several different base stations, and since the base station clocks are stable for long periods, that information is useful when the wireless handset returns to that base station. Thus, when the mobile GPS receiver in a wireless handset or similar enabled device returns to a known cell site at a later time, the mobile GPS receiver already knows the offset between the cell site clock and GPS time, making a TTFF shorter for that mobile GPS receiver.

Figure 3:
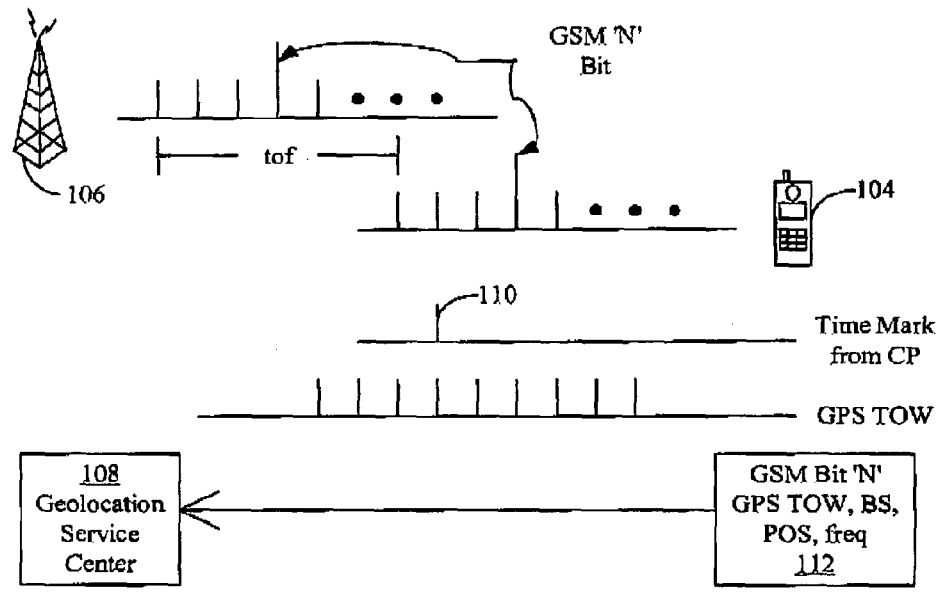
FIG. 3 is a diagram of the time tagging of GSM transmissions.

In FIG. 3, the time tagging of GSM transmissions is shown. A GSM network has been chosen for illustration. Other networks will have a similar implementation. This time-tagging is essential to the process of measuring the offset between GPS time and "network" time.

The CP section of the wireless handset 104 that has a valid GPS solution, generates a time mark 110 that may be implemented as a hardware pulse that the GPS receiver in the wireless handset tags with its own clock that has a known relation with the GPS system time that includes a "Time of Week" (TOW) portion. The CP section may also send a message to the GPS receiver identifying the GSM frame and bit number associated with the time mark, and the base station being used, as shown in Table 1. In the current implementation, a GPS time tag for the received GSM bit may be used for time tagging of the GSM transmission. By subtracting the time lag for transmission between the base station location and the wireless handset location, the wireless handset knows the GPS time when the GSM bit left the transmitting antenna.

The subtraction may be done in the wireless handset or the geolocation services center (i.e. a relocation server), but the server is used in the current embodiment.

In yet another implementation, the wireless handset 104 may measure the frequency difference between the GPS clock and the call processing clock (provided the GPS clock and call processing clocks are not the same clock). The GPS receiver in the wireless handset 104 may already have the ability to measure the frequency difference between its clock and the GPS system frequency standard. Similarly, the wireless handset may also already have the ability to measure the frequency difference between its call processing clock and the frequency received from the Radio Network transmitter located at a base station. Thus, all the components may be incorporated into a wireless handset to measure the frequency difference between the GPS system frequency standard and the wireless network transmitter frequency and may be located in the CP section of the wireless handset or the GPS receiver section depending on the design and implementation of the wireless handset.

Table 1 contains the information supplied by the CP section to accompany the time mark:

TABLE 1

| Name | Description |
| --- | --- |
| Base Station | Unique ID for current base station |
| CP_GSM_Frame | GSM Frame Number |
| CP_GSM_BIT | GSM Bit Number |
| Time_mark_uncertainty | Probable error between time mark and received bit edge (1 sigma) |

The geolocation server 108 may receive a number of parameters 112 from the wireless handset 104 including, but not limited to a GSM bit identifier, the associated GPS TOW and base station ID, position data, and frequency error. Once the clock offset and frequency difference is determined, a Kalman Filter or other estimation method may be used to model the wireless network's transmitter clock. In other implementations, the transmitter clock may be adjusted to minimize the errors. Such knowledge of the transmitter clock frequency and time error, enables better performance of the GPS receiver's TTFF, energy usage and position accuracy.

At a later time, the geolocation service center may propagate the stored time-tagged GSM frame/bit information to an approximate current time. This propagated time may then be transmitted to an acquiring wireless handset that does not currently have a GPS solution as described below.

Figure 4:
FIG. 4 is a diagram of GSM frames carrying GPS TOW.
Figure 4:
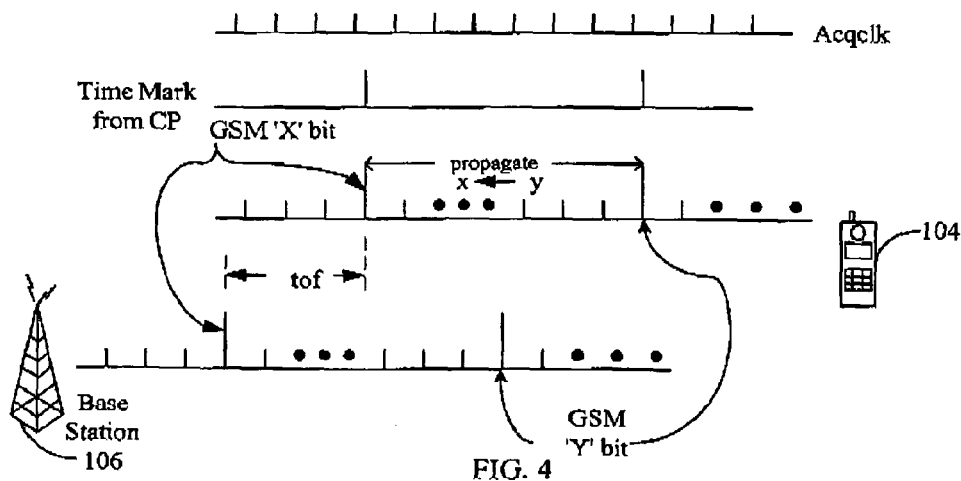

Turning to FIG. 4, a diagram of GSM frames carrying GPS TOW. This functionality provides for accurate GPS time to a wireless handset 104 that does not yet have a GPS position. It also illustrates the method by which the present invention compensates for network delays.

When the wireless handset 104 requests aiding from the geolocation service center 108, a message from the server to the wireless handset is sent. The message identifies the GPS time with a specific GSM frame/bit, identified as "GSM Bit Y" in the figure. The server creates this message from earlier measurements made by this, or other, wireless handsets as described above. When the message is received at the wireless handset 104, the CP section of the wireless handset 104 generates a time mark aligned with a current GSM frame/bit, identified as "GSM Bit X" in the figure. The CP section may also send a message to the GPS receiver identifying the GSM frame and bit number associated with the time mark, and the base station being used, as shown in Table 1. The GPS receiver will then propagate the GPS time from the bit identified in the message (Y) to the bit that is aligned to the time mark (X), using nominal, (or corrected, if clock drifts are available) frame rates, thus compensating for the network delay and geolocation service center 108 time estimation errors. Because the wireless handset 104 location is unknown, there is an unknown transmission delay from the base station 106 to the wireless handset 104. This delay presents an unavoidable error in the received GPS time, but is limited by the typically small sizes of cellular radio sites.

In Table 2, an example of one possible message sent from the geolocation server 108 to the GPS receiver in an acquiring wireless handset 104 is the following:

TABLE 2

| | NAME | Description | Units | Notes |
|---|---|---|---|---|
| gps_time_tag | VLMU_GPS_Week | GPS Week Number | Weeks | These are shown as |
| | VLMU_GPS_TOW | GPS Time of Week | Usec | GPS TOW in FIG. 4. |
| freq | VLMU_Freq_Error | Base Station Freq. Error | Nsec/sec | This is 'freq' in FIG. 4. |
| List_of_meas_uncertainties | VLMU_Time_Accuracy | Uncertainty of GPS time | Usec | |
| | VLMU_Freq_Err_Acc | Uncertainty of Clock Error | Nsec/sec | |
| network_reference_time | VLMU_GSM_Frame | GSM Frame Number | None | This is bit Y in FIG. 4 |
| | VLMU_GSM_Bit | BSM Bit Number | None | |

The items in Table 2 may be repeated once for each base station identified in a data structure such as a neighbor list that identifies base stations near the current base station in the wireless network. In some implementations, the CP section of the wireless handset 104 may filter the list of base stations and only provide data for the serving base station.

Using the data items in Table 1 and Table 2, the algorithms used to convert time-tagged GSM frames to precise GPS time employed in the current implementations are:

---

CP_Bits = CP_GSM_Frame * 1250 + CP GSM_Bit
VLMU_Bits = VLMU_GSM_Frame * 1250 + VLMU_GSM_Bit
DeltaGSM = CP_Bits-VLMU_Bits
IF deltaGSM < −2710000 * 1250
deltaGSM += 2715648 * 1250
ELSEIF deltaGSM > 2710000 * 1250
DeltaGSM −= 2715648 * 1250
ENDIF
DeltaTime = deltaGSM * SecPerGSMBit/(1+VLMU_Freq_error*1e$^{-9}$)
GPS_TOW = VLMU_GPS_TOW + deltaTime * 1e$^6$
GPS_Week = VLMU_GPS_Week
IF (GPS_TOW >= 604800 * 1e$^6$)
{GPS_TOW −= 604800 * 1e$^6$
GPS Week++
}
ELSEIF (GPS_TOW < 0
{GPS_TOW += 604800 * 1e$^6$
GPS_Week−−
}

--- time_uncertainty=*VLMU*_Time_Accuracy+time_mark_uncertainty.

Figure 5:
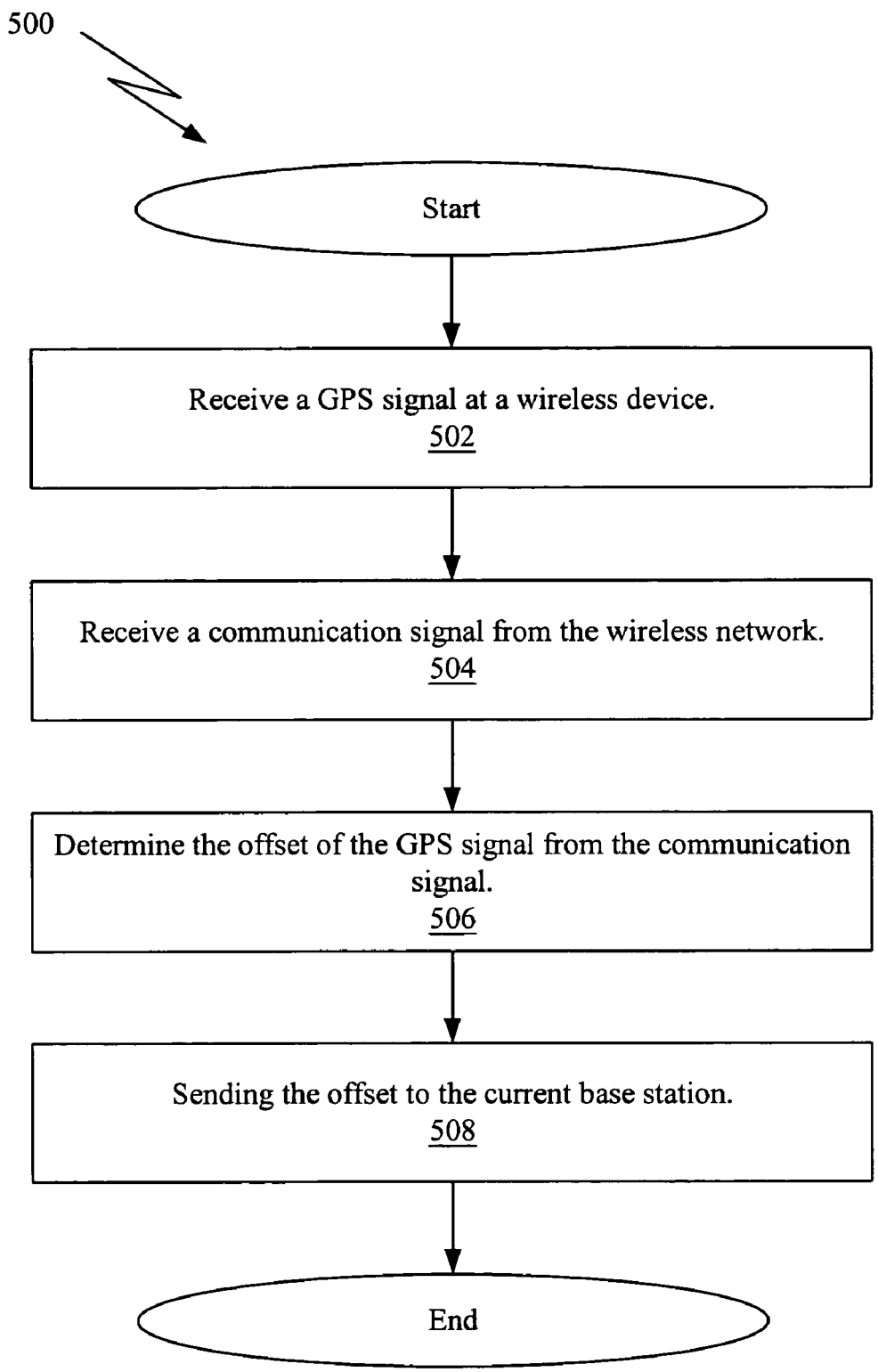
FIG. 5 is a flow diagram of offset determination.

In FIG. 5, a flow diagram 500 of offset determination is shown. A wireless handset 104 receives a GPS signal 114 at a GPS receiver in step 500. The wireless handset 104 also receives a communication signal 116 from the wireless network in step 504 that contains timing information. The controller then determines the time offset and/or drift between the clock at base station 106 sent in the received communication signal 116 and the GPS time sent in GPS signal 114 in step 506. The offset may then be sent back to the current base station 508.

Figure 6:
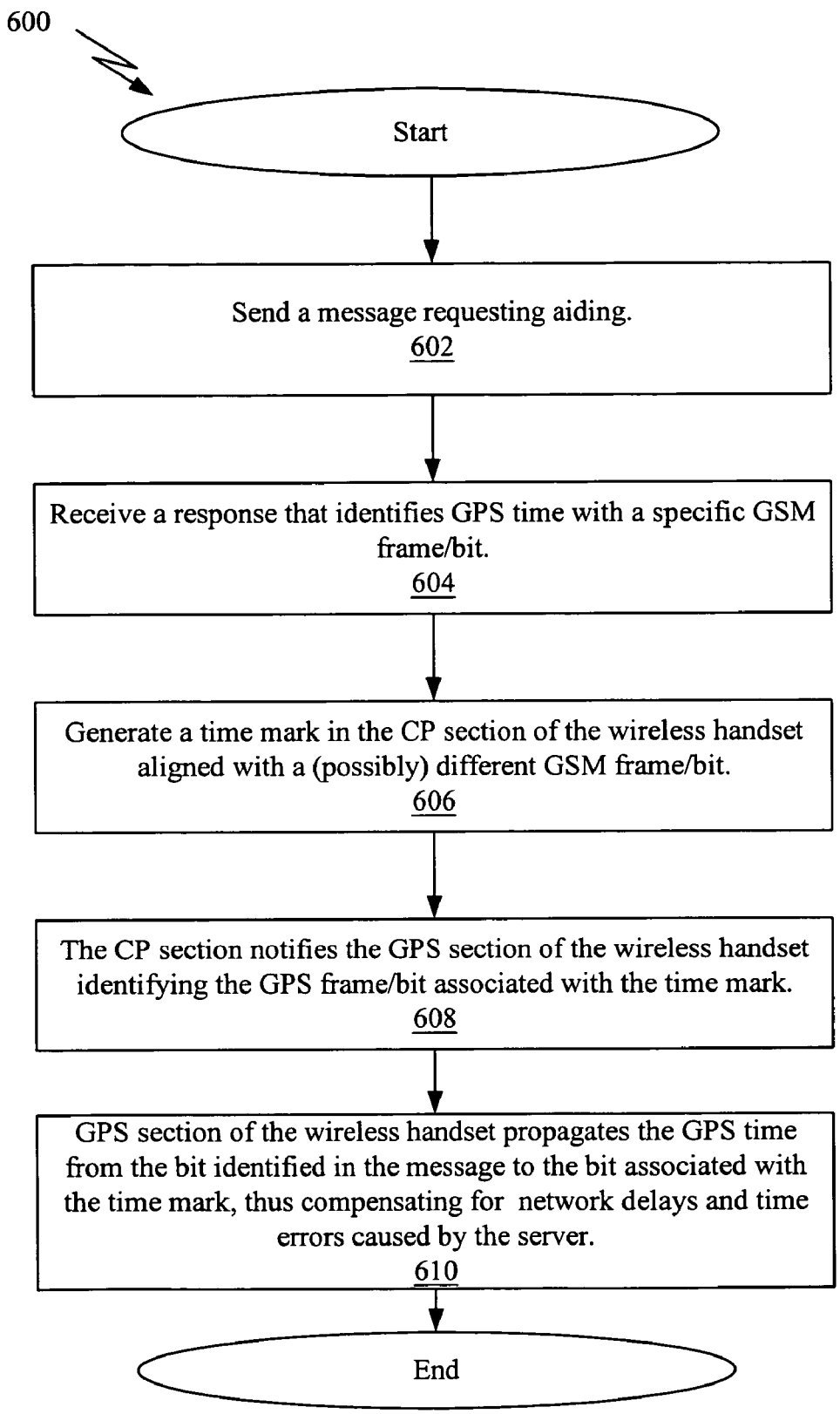
FIG. 6 is a flow diagram of a wireless handset using the offset determined in FIG. 5.

Turning to FIG. 6, a flow diagram 600 of a wireless handset using offset determined in FIG. 5 is illustrated. A wireless handset 104 requests aiding from the geolocation server 108 in step 602, a message from the geolocation server 108 to the wireless handset is sent, step 604. The message identifies the GPS time with a specific GSM frame/bit, identified as "GSM Bit Y" in FIG. 4. The geolocation server 108 creates this message from earlier measurements made by this, or other, wireless handsets. When the message is received at the wireless handset 104, the CP section of the wireless handset 104 generates a time mark aligned with a (possibly) different GSM frame/bit, identified as "GSM Bit X" in FIG. 4, see step 606. In step 608, the CP section may also send a message to the GPS receiver identifying the GSM frame and bit number associated with the time mark, and the base station being used, as shown in Table 1. The GPS section of the wireless handset 104 propagates the GPS time from the bit identified in the message to the bit associated with the time mark, thus compensating for network delays and time errors caused by the geolocation service center server 108 in step 610. Because the wireless handset 104 location is unknown, there is an unknown transmission delay from the base station 106 to the wireless handset 104. This delay presents an unavoidable error in the received GPS time, but is limited by the typically small sizes of cellular radio sites.

The flow diagrams in FIG. 5 and FIG. 6 may be implemented in software or hardware or a combination of software and hardware. The software may be presented on a signal-bearing medium that contains machine-readable instructions such as magnetic tape, compact disc, paper punch cards, smart cards, or other optical, magnetic, or electrical digital storage device. A controller may execute the software presented on the signal-bearing medium. Examples of a controller may include a microprocessor, digital signal processor, digital circuits configured to function as a state machine, analog circuits configures to function as a state machine, a combination of any of the above configured to execute the programmed instructions, such as presented on the signal-bearing medium.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A wireless mobile communication device, comprising:
a transmitter in the wireless mobile communication device to send a request message that requests aiding information from a geolocation server;
a receiver in the wireless mobile communication device in receipt of a response message from the geolocation server that is other than a cellular base station, wherein the response message identifies absolute time with a first frame/bit number (bit Y);

a call processing section coupled to the receiver that generates a timing mark aligned to a second frame/bit number (bit X), wherein the second frame/bit number (bit X) is different from the first frame/bit number (bit Y); and a Global Positioning System (GPS) receiver in the wireless mobile communication device in receipt of a notification message from the call processing section that identifies the second frame/bit number (bit X) aligned to the timing mark, where the GPS receiver propagates the absolute time from the first bit (bit Y) identified in the response message to the second bit (bit X) aligned to the timing mark that enables the GPS receiver to compensate for network delay and time errors caused by the geolocation server.

2. The wireless device of claim 1, where each of the first frame/bit number (bit Y) and the second frame/bit number (bit X) is a GSM frame/bit number.

3. The wireless device of claim 1, where the network delay comprises compensation for time estimation errors of the geolocation server.

4. A method for synchronizing a wireless mobile communication device, comprising:

sending by a transmitter in the wireless mobile communication device a request message that requests aiding information from a geolocation server;

receiving at a receiver in the wireless mobile communication device a response message from the geolocation server that is other than a cellular base station, wherein the response message identifies absolute time with a first frame/bit number (bit Y);

generating in a call processing section that is coupled to the receiver, a timing mark aligned to a second frame/bit number (bit X), wherein the second frame/bit number (bit X) is different from the first frame/bit number (bit Y);

receiving at a Global Positioning System (GPS) receiver in the wireless mobile communication device a notification message from the call processing section that identifies the second frame/bit number (bit X) aligned to the timing mark;

propagating the absolute time from the first bit (bit Y) identified in the response message to the second bit (bit X) aligned to the timing mark; and compensating for network delay and time errors caused by the geolocation server in the GPS receiver.

5. The method of claim 4, where each of the first frame/bi number (bit Y) and the second frame/bit number (bit X) is a GSM frame/bit number.

6. The method of claim 4, where compensating for network delay comprises compensating for time estimation errors of the geolocation server.

* * * * *

UNITED STATES PATENT AND TRADEMARK OFFICE
CERTIFICATE OF CORRECTION

PATENT NO. : 7,925,210 B2  Page 1 of 1
APPLICATION NO. : 11/205510
DATED : April 12, 2011
INVENTOR(S) : Brown et al.

It is certified that error appears in the above-identified patent and that said Letters Patent is hereby corrected as shown below:

On the Title Page, in item (57), under "ABSTRACT", in Column 2, Lines 1-2, delete "Synchronizing a Radio Network with End User Radio Terminals A" and insert -- Synchronizing a Radio Network with End User Radio Terminals. A --, therefor.

On Page 2, in item (56), under "U.S. PATENT DOCUMENTS", in Column 2, Line 43, delete "342/357.15" and insert -- 342/357.43 --, therefor.

In the Specification

In Column 3, Line 20, delete "OPS" and insert -- GPS --, therefor.

In Column 3, Line 54, delete "handset 114" and insert -- handset 104 --, therefor.

In Column 7, Line 47, delete "GPS Week++" and insert -- GPS_Week++ --, therefor.

In the Claims

In Column 10, Line 21, in Claim 5, delete "frame/bi" and insert -- frame/bit --, therefor.

Signed and Sealed this
Fifth Day of May, 2015

Michelle K. Lee
*Director of the United States Patent and Trademark Office*